United States Patent [19]

Gravemann

[11] Patent Number: 5,407,499
[45] Date of Patent: Apr. 18, 1995

[54] MAKING A MOLD FOR CONTINUOUS CASTING

[75] Inventor: Horst Gravemann, Osnabrück, Germany

[73] Assignee: KM Kabelmetal A.G., Osnabrück, Germany

[21] Appl. No.: 47,093

[22] Filed: Apr. 14, 1993

Related U.S. Application Data

[63] Continuation-in-part of Ser. No. 445,122, Nov. 30, 1989, abandoned, which is a continuation of Ser. No. 852,841, Apr. 16, 1986, abandoned.

[30] Foreign Application Priority Data

Apr. 19, 1985 [DE] Germany .................. 35 14 123.9

[51] Int. Cl.⁶ ................................ C22F 1/08
[52] U.S. Cl. ................................ 148/685; 148/686; 148/411
[58] Field of Search .............. 148/685, 686, 411

[56] References Cited

U.S. PATENT DOCUMENTS 4,421,570 12/1983 Gravemann ............... 148/411

Primary Examiner—Melvyn J. Andrews
Assistant Examiner—Robert R. Koehler

[57] ABSTRACT

A tubular blank made of an age-hardening copper alloy is annealed and quenched; whereupon a mandrel of the final shape and size of the interior cavity of the mold to be made is inserted; whereupon the blank is forced onto the mandrel primarily by drawing, but also rolling, forging, electrodynamically or hydrostatically shaping, or a combination thereof is considered.

7 Claims, 1 Drawing Sheet

MAKING A MOLD FOR CONTINUOUS CASTING

BACKGROUND OF THE INVENTION

The present application is a continuation in part application of Ser. No. 07/445,122 filed Nov. 30 1989 and abandoned at the time of this application and which in turn was a FWC application of Ser. No. 06/852,841 filed Apr. 16, 1986 now abandoned. The invention relates to the making of pass-through molds for machines for continuous casting using tubular blanks which have been made by extrusion and/or drawing and/or forging of age-hardening copper alloys whereby these blanks are at first solution-annealed followed by quenching and actual hot or warm age-hardening.

German printed patent application 26 35 454 proposes a material for molds for continuous casting which includes age-hardening copper alloys whereby a suitable selection of the alloying components have been made to include, for example, chromium and zirconium so as to obtain high thermal conductivity, hot strength values, and strength against material creapage and hot plasticity. Such alloys are used for making mold plates to be used in the assembly of molds and they will be solution-annealed at 1030 degrees C, quenched in water and age-hardened at a temperature of 475 degrees C. Thereafter, curing and milling are carried out on the plate in order to obtain the final dimensions.

These steps as outlined can also be used for the making of thick wall tubular single piece molds provided that after the tubular blank has been made through press working, drawing, or the like, one immediately provides for the hardening treatment following which cutting or milling is carried out to obtain the final dimensions. However, these method steps are not applicable if in the case of straight molds or curved, conical or partial conical molds, a mandrel with the final dimensions is introduced in the copper based tubular blank and forced onto the mandrel in a final cold working step as shown and described in German patent 18 09 633.

U.S. Pat. No. 4,421,570 discloses a method of making a mold for continuous casting according to which an age hardening copper alloy is used including as additional alloy components zirconium, nickel, chromium, cobalt, phosphorus and beryllium to make a tubular blank and solution heat treating the blank. There is then carried out a cold working step and the then pre-sized blank is age-hardened at a temperature within the range of 400° C. to 600° C. which temperature treatment is followed by an explosion forming step in order to finalize the sizing shaping so as to obtain the final dimensions of the mold, particularly the interior of the mold cavity.

DESCRIPTION OF THE INVENTION

It is an object of the present invention to provide a new and improved method for making tubular molds of age-hardening copper material so as to satisfy requirements as to quality.

It is a particular object of the present invention to provide a new and improved method for making a mold for continuous casting using a tubular blank made through extrusion, drawing or forging or any combination thereof and using furthermore an age-hardening copper alloy, also the steps of solution-annealing, quenching and hot or warm age-hardening of these parts are to be retained in the process.

In accordance with the preferred embodiment of the present invention it is suggested that prior to warm age-hardening, a cold forming and sizing of the blank is carried out to obtain the wall dimensions under utilization of an inserted mandrel. In particular there is to be no sizing and cold working and shaping step to be carried out after the final warm age hardening step. It has been found that if this cold working and sizing step is carried out prior to warm age hardening and under utilization of a mandrel having the final dimensions and contour and upon which the blank is forced prior to warm age hardening, then any distortion of the mold during continuous casting is no longer to be expected, particularly if a warm working step completes the process of mold making for purposes of warm age-hardening of the copper material. Molds made in this manner have a very long life, and even after extensive use they retain the dimensions at minimum wear.

Cold working and sizing by means of a mandrel can be carried out in different ways. Mandrel and blank are together moved through a die. Reference is made here to German patent 18 09 633 wherein a straight tubular blank is forced upon a curved mandrel having final dimensions and the shape of the mold to be made whereby the outer dimensions of the mandrel are slightly different from the internal dimensions of the blank being processed so that the blank has to be pre-shaped corresponding to the actual mandrel dimensions.

As per the invention, the blank and inserted mandrel are together dram through a die in order to firmly force the inner surfaces of the tubular blank upon the mandrel. The drawing step may be supplemented by further cold working steps or the latter may be used in the alternative. Advantageous mode of procedure is to provide cold working and sizing by applying a force upon the outer wall of the blank, e.g. through forging or rolling. Still other methods for shaping in this regard are hydrostatic and electrodynamic methods. In special cases it was found suitable to combine two or more of these various ways of cold working. By way of example the tubular blank together with inserted mandrel may be drawn through a die while at the same time additional cold working is carried out through rolling or forging and a final application of force is carried out as stated. Subsequently the mandrel is forced out of the now cold hardened blank.

Solution annealing of the blank prior to cold working or sizing may be carried out in air subsequently requiting that the surface of the blank be cleaned or smoothed through grinding or polishing. In some cases it may be of advantage if the solution annealing does encompass the entire tubular blank while in other cases it may suffice to solution anneal just the interior space of the tubular blank but in a reducing atmosphere. This latter method can be carried out with advantage by filling dry charcoal into the interior of the tubular blank and closing the ends of this tubular blank on both ends with partially perforated sheet metal caps.

In carrying out the invention it is believed that practically all hardenable or hardening copper and copper based materials can be used whereby, particularly on account of these steps, annealing, cold working, and age-hardening one obtains properties and characteristics which render the resulting molds very suitable for that purpose. Particular alloys envisioned here are alloys on the basis of CuCr, CuCrZr, CuCoBe, CuCo-NiBe, CoCoNiBeCr, CuNiSi and others. Copper based material in which the invention can be applied with advantage are, for example, alloys having from 0.2 to 1.2% Cr, from 0.05 to 0.4% Zr, up to 0.04% Li, Ca, Mg, Si and/or Br as deoxidizing material; all percentages are by weight and the remainder being copper and the usual impurities.

As compared with my earlier patent (U.S. Pat. No. 4,421,570) the new method eliminates a very expensive and labor intensive final working step. Moreover the employment of explosion and detonation charges, particularly in the case of non-circular-round cross-sections is very complicated and incorrect dimensions may still result. In addition, surface defects such as indents may occur resulting in narrowing of the water gap that is needed for cooling. The invention avoids these drawbacks.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Proceeding now to the detailed description of the drawings, FIG. 1 illustrates a tubular blank of any kind of cross section including the cross sections shown in FIGS. 6. This tubular blank is comprised of a age-hardening copper alloy having 0.75% chromium; 0.17% zirconium; 0.02% phosphorus; the remainder being copper and the usual impurities. This tubular blank was annealed at 988° C. for one hour and in a reducing atmosphere. Subsequently the annealed blank was quenched in water. A mandrel of the kind generally shown in FIGS. 2, 3 and 5 but with a square shaped cross-section was provided and made of a hard chromium plated piece and having the desired dimensions of the mold to be made. This mandrel was inserted into the tubular blank just as shown in FIG. 2, and together they were passed through a die to thereby force the tubular blank into intimate contour matching contact with the mandrel. This drawing step is a cold working step providing about 15% deformation. The warm age-hardening as the last step in the process was carried out for a period of about 10 hours in a protective gas atmosphere at a temperature of 440° C. The resulting mold had the following properties:

| | |
|---|---|
| thermal conductivity | 342 W/mK |
| | (=90% of pure Cu) |
| recrystalizing temp. | 720° C. |
| hardness HB 2.5?62.5 | 160 |
| tensile strength | 530 N/mm² |
| 0.2 yield strength limit | 410 N/mm² |
| 0.2 yield strength limit (200° C.) | 395 N/mm² |
| 0.2 yield strength limit (350° C.) | 370 N/mm² |
| Elongation at fracture (20° C.) | 22% |
| Elongation at fracture (200° C.) | 21% |
| Elongation at fracture (350° C.) | 20% |
| Hot strength (200° C.) | 425 N/mm² |

-continued

| | |
|---|---|
| Hot strength (350° C.) | 380 N/mm² |

The following aspects must be considered. The annealing step of the tubular blank requires rather high temperatures. These temperatures could lead to a strong oxidation of the surface. One could remove that oxide layer, e.g. through pickling, but oxide would still remain because of the internal oxidation of chromium and zirconium. This oxidation may occur in the material to a depth of up to 1 mm. On the other hand, it is customary to electrolytically chromium plate or nickel plate the mold in order to reduce the abrasion wear during continuous casting. Owing to that oxidation of the alloy components, the resulting porosity severely impedes the adhesion of the plating material (chromium or nickel). This impeding is the result of an undesired porosity of the surface of the mold. Consequently, the inner oxide layer must be removed through mechanical grinding which thus is a step to be included if the mold is in fact to be chromium or nickel plated. This additional mechanical step is feasible without posing additional problems if one proceeds generally as per the invention. The grinding is carried out prior to the mandrel insertion plus drawing. Hence the latter working and sizing step will then eliminate any and all deviations in dimensions that may have resulted from the grinding. It should be mentioned, however, that the annealing when carried out in a reducing atmosphere or at least the annealing of the tube's interior so that there is no oxidation may obviate the need for the grinding entirely.

Figure 1:
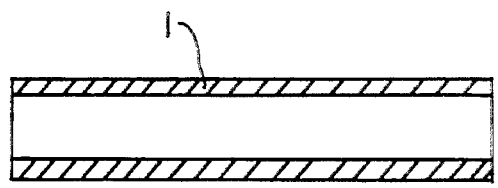
FIGS. 1–5 illustrate schematically a sequence of steps to be carried out for practicing the preferred embodiment of the present invention in accordance with the best mode thereof.
Figure 2:
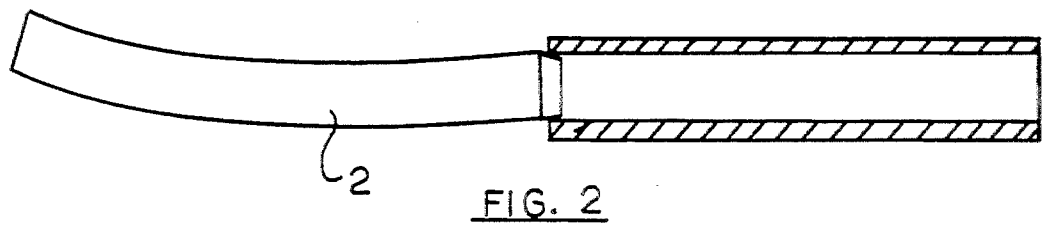
Figure 3:
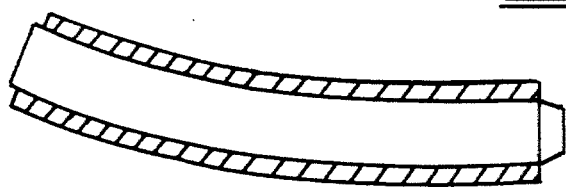
Figure 6:
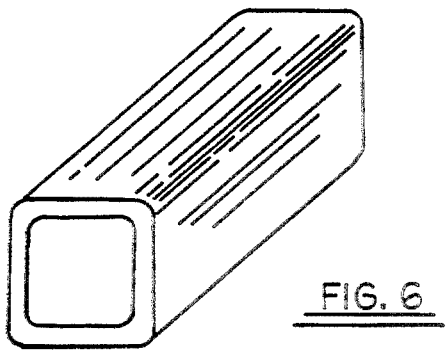
FIG. 6 is an alternative blank shown in a perspective view.

In a second example the blank was made as stated above having a contour as shown in FIGS. 6. This tubular blank is made by means of extrusion and/or drawing and/or forging. It is assumed that the blank 1 is made of an age-hardening Cu alloy having 0.5% Cr, 0.12% Zr, 0.015% Boron, the remainder being Cu and the usual impurities, all percentages by weight. This tubular blank is solution annealed, preferably in a reducing atmosphere at a temperature between a 1000° and 1020° C. for about ½ hour. Subsequently the thus annealed tube is quenched in water. Now again referring to FIG. 1 that the tubular blank 1 is assumed to be straight. Now as per the next step, a hard Cr plated mandrel 2 is forced into this tubular blank 1. The mandrel 2 is of a curved configuration. The end result is shown in FIG. 3. The curved mandrel 2 has forced a curved contour upon the tube 1. Subsequently and by means of external force application the tube is forced into intimate contact with the mandrel. For example, the mandrel plus tube configuration is forced through an annular drawing die. Alternatively one or several forging or rolling is exerted upon tube 1 so as to establish intimate contact with the mandrel throughout the interior of the tube and the interior of the tube assumes the outer dimensions of the mandrel 2 accordingly. Cold working of the copper tube 1 is selected so that the original hardness of 55 HB is increased from 80 to 100 HB.

Figure 4:
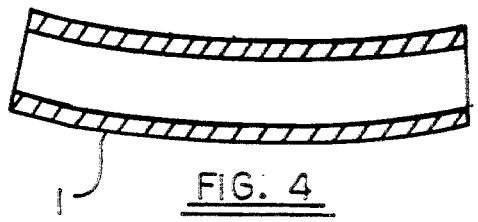
Figure 5:
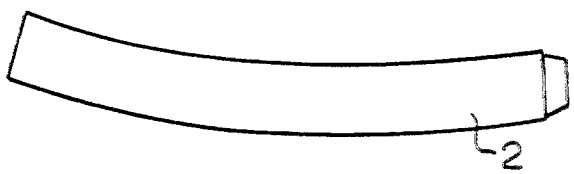

As shown, mandrel 2 has a curved configuration so as to match the desired curved contour of the mold to be made because such curving approximating a circle is desirable for purposes of ease of withdrawing an ingot from a mold. In addition, there may be a conical or frustoconical contour superimposed upon the interior of the mold. The mandrel will have to have a corresponding conical taper. Upon forcing the mandrel into the straight tube a certain deformation occurs inherently thus forcing the tube 1 to assume a curved contour. The tube 1 may have been prepared initially to have already a slightly curved configuration which facilitates the introduction and insertion of the curved mandrel. Following the removal of the mandrel from the tube which is shown in FIG. 4 and 5, the now very accurately dimensioned mold tube 1 is warm age-hardened for about 3 to 4 hours at a temperature between 460° to 480° C. This warm age-hardening treatment is preferably carried out in a protective gas atmosphere.

The particular Cu alloy used for the tube 1 as mentioned above was provided with the following characteristic data as a result of the process carried out as described.

| Thermal conductivity: | 324 W/m.K |
| --- | --- |
| Recristalisation Temperature: | 700° C. |
| Softening Temperature: | 500° C. |
| HB hardness 2.5/62.5: | 142 |
| Tensile strength: | 445 N/mm$^2$ |
| 0.2 yield strength limit: | 360 N/mm$^2$ |
| Elongation at fracture: | 18% |
| Hot strength at 200° C.: | 416 N/mm$^2$ |
| Elongation at fracture at 200° C.: | 17% |
| Hot strength at 350° C.: | 352 N/mm$^2$ |
| Elongation at fracture at 350° C.: | 15% |

These values should be compared with data of a non-calibrated mold which has not been provided and subjected to the inventive process, but has the same alloying consistency:

| Thermal conductivity: | 315 W/m.K |
| --- | --- |
| Recristallization temperature: | 700° C. |
| Softening temperature: | 500° C. |
| HB hardness 2.5/62.5: | 115 |
| Tensile strength: | 375 N/mm$^2$ |
| 0.2 yield strength limit: | 282 N/mm$^2$ |
| Elongation at fracture: | 19% |
| Hot strength at 200° C.: | 345 N/mm$^2$ |
| Elongation at fracture at 200° C.: | 16% |
| Hot strength at 350° C.: | 285 N/mm$^2$ |
| Elongation at fracture at 350° C.: | 14% |

The advantages of the invention can be readily demonstrated by comparing tolerance and accuracy figures of a mold made as per the invention and mold made as per my earlier U.S. Pat. No. 4,421,570. Then desired dimensions for a mold with square shaped cross-sections a bending radius of 6 meters and a wall thickness of 12 mm.

| upper mold end | 125 × 125 ± 0.1 mm |
| --- | --- |
| middle portion | 124.4 × 124.4 ± 0.1 mm |
| lower mold end | 123.8 × 123.8 ± 0.1 mm |

After the two methods were practiced "new" (as per the invention) and "old" as per the U.S. Pat. No. 4,421,570, the following dimensional aspects were observed.

| | old | new | des. dim. |
| --- | --- | --- | --- |
| upper mold end | 125.28 | 125.05 | 125 ± 0.1 mm |
| middle portion | 124.42 | 124.46 | 124.4 ± 0.1 mm |
| lower mold end | 124.13 | 123.83 | 123.8 ± 0.1 mm |

The "old" method did yield adequate agreement between desired and actual dimensions in the middle portion of the mold, but upper and lower mold ends deviated from the desired dimensions to an unacceptable extent. In fact, one can see that the desired lower end conicity at the lower mold end was reversed. Owing to the contraction of the progressively cooling strand after emergence from the mold this reversed conicity led to severe casting problems and unsatisfactory results.

Figure 7:
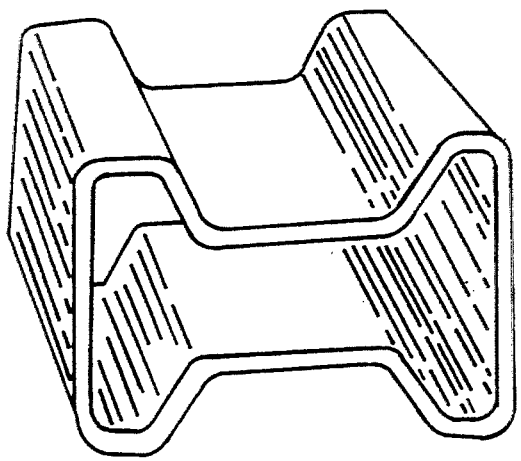
FIG. 7 shows a complex shape to be made under utilization of the method in accordance with the preferred embodiment of the present invention.

The example for practicing the invention centered on a square shaped cross section, but round ones or blanks with a rectangular or polygonal cross section of a known variety can be used. Complex cross sections such as T or double T or I shaped cross section can readily be used. The double T or I-shaped cross section is shown in FIG. 7. In all these cases a mandrel to be inserted has to have the corresponding cross section for the process to be used with advantage.

The invention is not limited to the embodiments described above but all changes and modifications thereof, not constituting departures from the spirit and scope of the invention, are intended to be included.

What is claimed is:

1. Method for making a copper based single element mold for continuous casting using a tubular blank of age-hardening copper or copper based alloy, and including the steps of solution annealing, quenching and warm age-hardening, the improvement of interposing between the quenching step and the warm age-hardening step, (a) a step of inserting a sizing mandrel into the tubular blank, and (b) a final working step, said final working step being a step of cold working and sizing and including forcing the blank onto the inserted mandrel;

the warm age hardening being a final step of the method, there being no cold working and/or sizing after the final step; and said solution annealing being carried out in a reducing atmosphere in that the interior of the tube is exposed to that reducing atmosphere.

2. Method as in claim 1 wherein following insertion of the mandrel into the quenched blank, the mandrel and the blank are together drawn through a die.

3. Method as in claim 1 wherein following the insertion of the mandrel into the quenched tubular blank, the blank is forced upon the mandrel by means of rolling.

4. Method as in claim 1 wherein following the insertion of the mandrel into the quenched tubular blank, the blank is forced upon the mandrel by means of forging.

5. Method as in claim 1 wherein following the insertion of the mandrel into the quenched tubular blank, the blank is forced upon the mandrel by means of electrodynamic forming.

6. Method as in claim 1 wherein following the insertion of the mandrel into the quenched tubular blank, the blank is forced upon the mandrel by means of hydrostatic pressure.

7. Method as in claim 1 using a copper alloy which includes, all percentages by weight, 0.2 to 1.2% Cr, 0.05 to 0.4% Zr, up to 0.04% of at least one of the following P, Li, Ca, Mg, Si, B, the remainder being copper and the usual impurities.

* * * * *